United States Patent [19]
Patel et al.

[11] Patent Number: 5,737,751
[45] Date of Patent: Apr. 7, 1998

[54] CACHE MEMORY MANAGEMENT SYSTEM HAVING REDUCED RELOADS TO A SECOND LEVEL CACHE FOR ENHANCED MEMORY PERFORMANCE IN A DATA PROCESSING SYSTEM

[75] Inventors: Rajesh Bhikhubhai Patel; Sung-Ho Park; Romesh Mangho Jessani; Belliappa Manavattira Kuttanna, all of Austin, Tex.

[73] Assignees: Intellectual Business Machines Corporation, Armonk, N.Y.; Motorola, Inc., Schaumburg, Ill.

[21] Appl. No.: 622,254

[22] Filed: Mar. 26, 1996

[51] Int. Cl.⁶ .................................................. G06F 12/12
[52] U.S. Cl. .................................... 711/133; 711/122
[58] Field of Search ............................. 395/449, 460, 395/461, 463, 465, 466, 471, 472, 486, 487

[56] References Cited

U.S. PATENT DOCUMENTS

| | | |
|---|---|---|
| 5,386,547 | 1/1995 | Jouppi ........................... 395/449 |
| 5,564,035 | 10/1996 | Lai ................................. 395/471 |

*Primary Examiner*—Eddie P. Chan
*Assistant Examiner*—Kevin L. Ellis
*Attorney, Agent, or Firm*—Brian F. Russell; Andrew J. Dillon

[57] ABSTRACT

A data processing system having enhanced memory performance is provided. The data processing system comprises a processor that issues memory requests, a multilevel storage system including a first level cache, a second level cache, and a main memory connected to the processor in a memory hierarchy, and a memory controller. The memory controller retrieves a cache line from main memory, when a memory request for the cache line is received from the processor at the first level cache that causes a miss in both the first level cache and the second level cache. The memory controller loads the retrieved cache line in both the first level cache and the second level cache if the received memory request is a load request, and loads the retrieved cache line in only the first level cache and not the second level cache if the received memory request is a store request. The resultant reduction in reloads to the second level cache enhances memory performance by allowing immediate execution of subsequent memory requests to the second level cache and producing a higher hit rate as a result of the reduction in castouts from the second level cache.

8 Claims, 3 Drawing Sheets

L1lkup Misses = nCBR
L2lkup Misses = nCBR

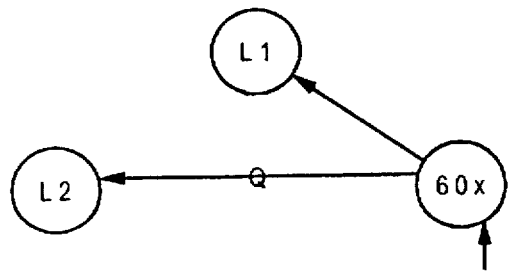

Fig. 1A
*Prior Art*

L1lkup Misses = nCBR
L2lkup Misses = CBR

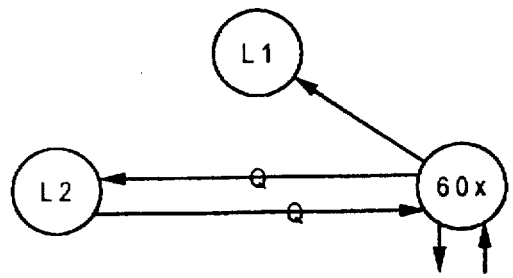

Fig. 1B
*Prior Art*

L1lkup Misses = CBR
L2lkup Misses = nCBR
(L1cst may cause an L2cst)

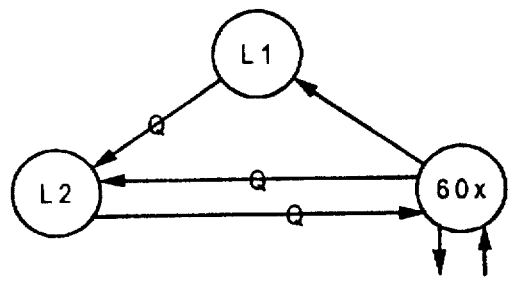

Fig. 1C
*Prior Art*

L1lkup Misses = CBR
L2lkup Misses = CBR
(L1cst may cause an L2cst)

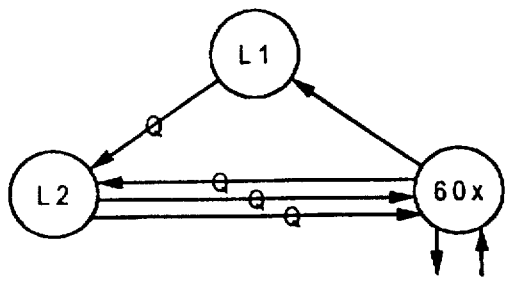

Fig. 1D
*Prior Art*

Notes:
  L1lkup/L2lkup are the L1/L2 lookups for the program-requested line.
  CBR/nCBR = copyback required / no copyback required.
  Q = indicates line is queued for that transfer.

CACHE MEMORY MANAGEMENT SYSTEM HAVING REDUCED RELOADS TO A SECOND LEVEL CACHE FOR ENHANCED MEMORY PERFORMANCE IN A DATA PROCESSING SYSTEM

BACKGROUND

1. Technical Field

The illustrative embodiment relates in general to an improved data processing system having a multilevel storage system, and in particular the illustrative embodiment relates to an improved data processing system having enhanced memory performance through reduced reloads to a second level cache.

2. Description of the Related Art

A computer system typically includes an information processor coupled to a hierarchial storage system. The hardware dynamically allocates parts of memory within the hierarchy for addresses deemed most likely to be accessed soon. The type of storage employed in each staging storage location relative to the processor is normally determined by balancing requirements for speed, capacity, and cost. Computer processes continually refer to this storage over their executing lifetimes, both reading from and writing to the staged storage system. These references include self-referencing as well as references to every type of other process, overlay, or data. It is well-known in the art that data storage devices using high-speed random access memories (RAM) can be referenced orders of magnitude faster than high volume direct-access storage devices (DASD's) using rotating magnetic media or optical disks (for example, CD-ROM). Such electronic RAM storage relies upon high-speed transfer of electrical charges over small distances, while DASD's typically operate mechanically by rotating a data storage position on a magnetic disk with respect to read-write heads. The relative cost of a bit of storage for DASD and RAM makes it necessary to use DASD for bulk storage and electronic RAM for processor internal memory and caching.

A commonly employed memory hierarchy includes a special, high-speed memory known as cache, in addition to the conventional memory, which includes main memory and bulk memory. Cache memory speed increases the apparent access times of the slower memories by holding the words that the CPU is most likely to access. The utility of a cache stems from a general characteristic of programs, which is that they tend to access data and code that were recently accessed or are located in nearby memory locations. This principle, called the principle of locality of reference, significantly improves the performance of the memory system.

A high-speed CPU cache enables relatively fast access to a subset of data and/or instructions which were previously transferred from main storage to the cache, and thus improves the speed of operation of the data processing system. Cache memory may also be used to store recently accessed blocks from secondary storage media such as disks. The transfer of operands or instructions between main storage and CPU cache is usually effected in fixed-length units called blocks. A block of data may be transferred in varying sizes such as tracks, sectors, lines, bytes, etc., as are known in the art. When accessing of the disk allows retrieval of necessary data from the cache, such success is called a "hit", and when retrieval of necessary data cannot be performed in the cache, such failure is called a "miss".

When the CPU requests a block of data or instructions and the request misses in the cache, the request is passed on to the main memory. If the request also misses in main memory, the necessary blocks are transferred from the disk to the main memory and, at the same time, they are written to the cache. If the CPU subsequently accesses the same blocks, the request will receive a hit in the cache and the block or cache line will be transferred from the cache and not the main memory, resulting in substantially faster accesses. However, since the cached capacity is smaller than that of the main memory and disk drive, not all the data blocks that may be required by the CPU are always stored in the cache or main memory. In order for a new block or cache line to be loaded when the cache is full, blocks must be removed, or castout, from the cache to make room for newly accessed data. A well known and commonly used cache replacement algorithm is a Least Recently Used (LRU) algorithm. According to the LRU algorithm, the block which has not been accessed in the cache for the longest period is selected as the least necessary block and is replaced by the new block.

The latest generation of personal computers typically utilize multi-level cache systems that divide the cache memory between an on-chip level-one (L1) processor cache and a separate, discrete level-two (L2) cache to further enhance system performance. The smaller L1 cache is integrated within the processor, significantly increasing the access speed of cache memory. The L2 cache is larger, typically in the range of 500 KB–1 MB, and increases performance by storing a larger block of data that contains the block of data stored in the L1 cache. Many microprocessors support second level caches up to one megabyte (1 MB) of external burst SRAM memory. The second level (L2) cache interface structure provides a dedicated 64-bit data bus as well as address and control support. The L2 cache may receive requests from both the level-one Icache and Dcache, independently.

Such multi-level cache systems operate with what is known as strong inclusion or weak inclusion. Strong inclusion requires that the entire data set or block of memory contained in the L1 cache be a subset of the block of memory contained in the L2 cache and that any store to the L1 cache is also stored in the L2 cache by a write-through operation. Weak inclusion requires that the L1 cache contain a subset of the block of memory in the L2 cache but that changes to the L1 cache are updated in the L2 cache periodically using a write-back operation.

Generally, memory requests from the first level cache are the result of instruction misses, data load or store misses, write-through operations, or cache management instructions. The L1 requests are looked-up in the L2 tags and are serviced by the L2 cache if they hit in the L2 tags, or are forwarded to the memory bus interface if they miss in the tags, or otherwise require memory bus operations.

Burst instruction fetches and burst data loads due to load or store misses in the Dcache that miss in the L2 cache initiate a reload operation from the memory bus for the missed cache line. The cache line received from the memory bus is forwarded to the L1 cache immediately, and is also loaded into the L2 cache. If the reload requires a new tag entry to be allocated in the L2 cache and the current tag is dirty (valid and modified), any dirty sectors of the tag to be replaced are castout from the L2 cache to the memory bus. Normal castouts (or replacement copybacks) due to load or store misses in the Dcache are normally stored to the L2 cache only. In some systems, they may also be stored to the memory bus if the L2 cache is configured for write-through operation in the L2 configuration registers. If the L1 castout requires a new tag entry to be allocated in the L2 cache and the current tag is dirty (valid and modified), any dirty sectors of the tag to be replaced are castout from the L2 cache to the memory bus.

FIGS. 1A–1D illustrate the general cache line flow for cache requests which miss in the L1 and L2 caches. FIG. 1A shows the cache line flow when the tag entry look-up for both the L1 and L2 misses and no replacement copybacks are required for L1 or L2. As can be seen, the cache line is sent to both L1 and L2, but is queued in the L2 reload queue for the transfer to L2. FIG. 1B shows the cache line flow where cache line misses in L1 and L2 and causes a castout in L2. As can be seen, this forces two memory requests to be queued by L2. FIG. 1C illustrates the cache line flow when a cache line misses in L1 and L2 and the subsequent load into L1 forces a castout to L2. While L2 does not require a replacement copyback for this example, the castout from L1 may force a castout from L2 in order to store the L1 castout. In that case, the L2 reload queue would service three requests. As seen in the example of FIG. 1D, a cache line in L1 and L2 that requires replacement copybacks from both caches could potentially generate four memory requests queued in L2.

The prior art concept of loading lines missed in the L1 cache to both the L1 cache and the L2 cache enables the larger L2 cache to contain data which might be subsequently replaced in the L1 cache due to its smaller size, thereby enhancing performance. For example, in a four-way associative L1 Dcache, a fifth load to the same index would cause the least-recently-used load location to be replaced. However, a subsequent reference to the replaced location would find the data in the L2 cache. Thus, by loading the cache line in both the L1 and L2 caches, processor performance is improved by allowing a shorter fetch time to the L2 cache as opposed to fetching the line from memory.

While this prior art system does enhance processor performance, it introduces a performance penalty. For every miss in the L1 and L2 caches that requires a burst linefill operation to be performed on the memory bus, forwarding the data obtained from memory to the L2 cache involves loading the L2 reload queue. Subsequent miss requests from the L1 cache are not serviced until the pending L2 reload queue is complete, and, as seen in FIG. 1D, the reload queue may be queued with up to four requests. This request bottleneck creates a resource shortage and results in processor performance degradation. This problem is more severe if the L2 cache data bus runs at a much slower frequency than the memory bus and the processor. This performance penalty is significantly amplified in low-end second level caches that have a reduced number of reload queues in order to reduce chip area or complexity. What is needed is a cache memory management system that takes advantage of the enhanced performance of a multilevel storage system, but which does not introduce this performance degradation and resource shortage seen with prior art cache management systems.

SUMMARY

According to the illustrative embodiment, a data processing system having enhancing memory performance through reduced reloads to a second level cache is provided. The data processing system comprises a processor that issues memory requests, a multilevel storage system including a first level cache, a second level cache, and a main memory connected to the processor in a memory hierarchy, and a memory controller. The memory controller retrieves a cache line from main memory, when a memory request for the cache line is received from the processor at the first level cache that causes a miss in both the first level cache and the second level cache. The memory controller loads the retrieved cache line in both the first level cache and the second level cache if the received memory request is a load request, and loads the retrieved cache line in only the first level cache and not the second level cache if the received memory request is a store request. The resultant reduction in reloads to the second level cache enhances memory performance by allowing immediate execution of subsequent memory requests to the second level cache and producing a higher hit rate as a result of the reduction in castouts from the second level cache. The above as well as additional objects, features, and advantages of the illustrative embodiment will become apparent in the following detailed written description.

BRIEF DESCRIPTION OF THE DRAWINGS

The novel features believed characteristic of the illustrative embodiment are set forth in the appended claims. However, the illustrative embodiment, as well as a preferred mode of use, and further objects and advantages thereof, will best be understood by reference to the following detailed description of an illustrative embodiment when read in conjunction with the accompanying drawings, wherein:

FIGS. 1A–1D illustrate the general cache line flow for cache requests which miss in the L1 and L2 caches;

DETAILED DESCRIPTION OF THE PREFERRED EMBODIMENT

Figure 2:
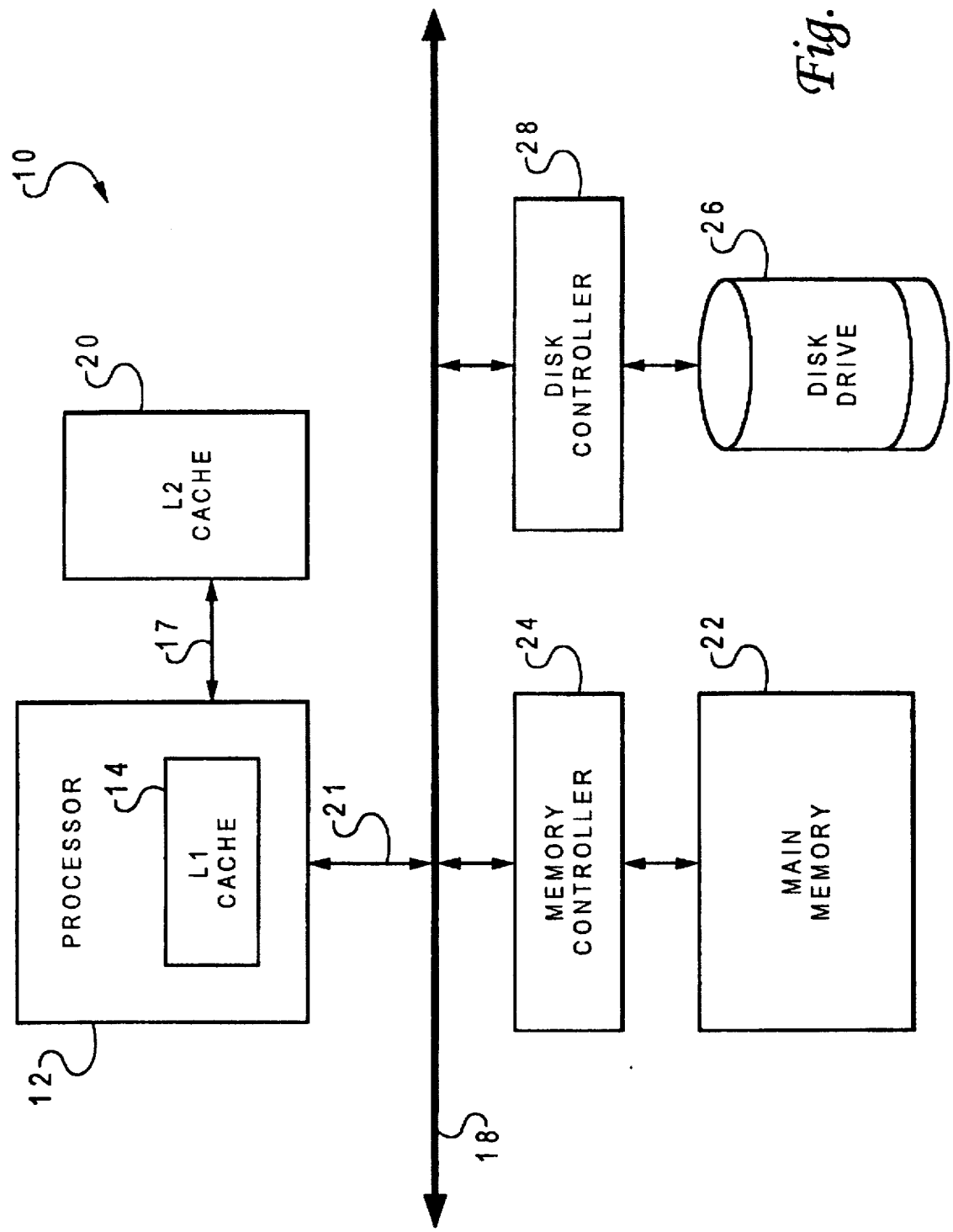
FIG. 2 illustrates a block diagram of a data processing system for processing information according to a preferred embodiment of the illustrative embodiment.

FIG. 2 illustrates a block diagram of a data processing system, indicated generally at 10, for processing information according to a preferred embodiment of the illustrative embodiment. In the depicted embodiment, data processing system 10 includes processor 12, which comprises a single integrated circuit superscalar microprocessor. Accordingly, processor 12 includes various execution units, registers, buffers, memories, and other functional units, which are all formed by integrated circuitry. In a preferred embodiment of the illustrative embodiment, processor 12 comprises one of the PowerPC™ line of microprocessors produced by International Business Machines, Inc. and Motorola, Inc., which operates according to reduced instruction set computing (RISC) techniques.

The system of FIG. 2 has a hierarchical memory configuration of a primary level cache, secondary level cache, main memory, and disk storage. Processor 12 includes an on-chip L1 cache 14 as the primary level cache. In preferred embodiments, L1 cache 14 has a storage capacity in the range of 8 KB to 32 KB. As will be appreciated, L1 cache 14 may comprise a bifurcated cache having a data cache (Dcache) component and an instruction cache (Icache) component, and, further, the components may be a single static random-access memory (SRAM) device or two physically separate devices within processor 12. A secondary cache, L2 cache 20, is connected to the processor 12 (at a bus interface unit) by a local bus 17. L2 cache 20 is usually much larger than the primary on-chip cache, having a capacity in the range of 64 KB to 1 MB, but is much slower to access. In typical operation, L2 cache 20 contains a subset of the block of memory contained in main memory 22. In the same manner, L1 cache 14 contains a subset of the block of memory stored in L2 cache 20. The high speed L1 and L2 caches enable the processor to achieve relatively fast access time to a subset of data or instructions previously transferred from main memory to the high speed caches, thus improving the speed of operation of the data processing system. Processor 12 is coupled to system bus 18 by address and data lines 21. Main memory 22 is connected to system bus 18 through memory controller 24. Typically, main memory is implemented using random-access memories (RAMs), having a storage capacity of 1 MB to 64 MB. Mass storage is provided by DASD (Disk Drive) 26, coupled to the system bus 18 through a disk controller 28.

The memory for the data processing system of FIG. 2 is thus hierarchical from fastest to slowest, and from smallest to largest, and from most expensive (per byte) to least expensive, in progression from the on-chip cache 14, to the secondary cache 20, to the main memory 22, to the disk storage 26. The CPU can access the on-chip cache 14 within one cycle, whereas it takes several cycles to access the secondary cache 20. If a cache miss occurs in primary and secondary caches, then the main memory 22 is accessed to do a cache replacement or cache line fill operation, replacing a cache line with a "line" from main memory 22, which may be, for example, 1024-bits in length. This cache line contains the addressed data that caused the cache miss, i.e., this cache replacement operation is usually used to satisfy the attempted access for which a cache miss occurred. If the main memory 22 does not contain the location for which a cache fill is attempted, then a page containing this data is accessed from disk storage 26, then the cache fill is completed and the memory access satisfied. The time required to acquire a page from disk 26 and write it to main memory 22 would be many thousands of CPU cycles, during which the CPU is ordinarily switched to do another task, or stalled, waiting for the data to satisfy the request. For optimum performance, the object is for the caches 14 and 20 to contain the data most likely to be used next, and, based the principle of locality and immediacy, this is approximated by maintaining data in cache that is used more recently by the tasks executing on the CPU.

Processor 12 issues memory requests to the multi-level storage system, which comprises L1 cache 14, L2 cache 20 and main memory 22. Processor 12 initiates the memory request by sending the physical address to L1 cache 14. The cache compares the physical address with all of its address tags to see if it holds a copy of the datum. If the operation is a read access and the cache holds the given datum, the cache reads the requested data from its own high-speed RAM and delivers it to the CPU. This cache hit results in must faster access to the data than reading the same values directly from main memory. If the L1 cache 14 does not hold the datum, however, a cache miss occurs and L1 cache 14 passes the address to L2 cache 20 to read the datum. Because L2 cache 20 is larger than L1 cache 14, it is more likely that a cache hit will occur because of the principle of locality of reference. Again, because L2 cache 20 is high-speed RAM, the memory access is much faster than accessing the same value in main memory 22. If a memory request is received from processor 12 that causes a miss in both the first level cache and the second level cache, the multilevel storage system passes the address to the main memory system to read the datum.

According to the illustrative embodiment, data processing system 10 enhances memory performance through reduced reloads to the second level cache, upon the occurrence of a miss in both the L1 and L2 caches. The memory request from processor 12 will typically be a store or load request for a cache line stored in main memory. If the memory request for the cache line causes a miss in both the first level cache and the second level cache, the cache line is accessed in main memory 22 via memory controller 24. Memory controller 24 retrieves the cache line from main memory 22. The cache controller function of processor 12, or dedicated cache controller hardware determines if the received memory request is a load request or a store request. If the received memory request is a load request, processor 12 then loads the retrieved cache line in both the first level cache 14 and the second level cache 20. If the received memory request is a store request, processor 12 loads the retrieved cache line in only the first level cache 14 and not the second level cache 20. For store instructions, which intend to modify data in the L1 data cache, the linefill needs to be performed only in the L1 cache. This is because once the linefill is completed, the line will be modified and marked dirty.

Thus, according to the illustrative embodiment, the cache memory management system differentiates between load-initiated and store-initiated linefills. In the prior art, on the other hand, multi-level cache systems are based on strong or weak inclusion, and so require all linefills, whether store initiated or load-initiated, to be loaded into both the first level and the second level caches. It will be appreciated that by not forwarding the linefill data to the L2 cache when retrieving a cache line from main memory 22 for a store-initiated memory request, the L2 cache reload queues are free for subsequent L1 miss requests. In addition, when the linefill is carried out to both the L1 and L2 caches, as is done in the prior art, there is the possibility that the L2 linefill is replacing a dirty line which needs to be castout to main memory. Since the illustrative embodiment does not cause L2 castouts for store-initiated linefills, the hit rate in the L2 increases, resulting in better overall memory and processor performance. Thus, memory performance is enhanced by better resource utilization, reduced reload queuing, and reduced cache castouts. The performance advantages of a multi-level cache system are retained by the illustrative embodiment, since if, based on a LRU scheme, the cache line is replaced by a subsequent memory request, the cache line will be written to the L2 cache. Subsequent requests to this line will then miss in the L1 cache but hit in the L2 cache. An additional advantage of the illustrative embodiment can be seen in power sensitive portable microprocessors used in portable devices such as a laptop computer. Because the illustrative embodiment reduces the number of reloads to the second level cache and eliminates unnecessary castouts from the second level cache, a considerable amount of power may be conserved by decreasing the number of memory array accesses.

Figure 3:
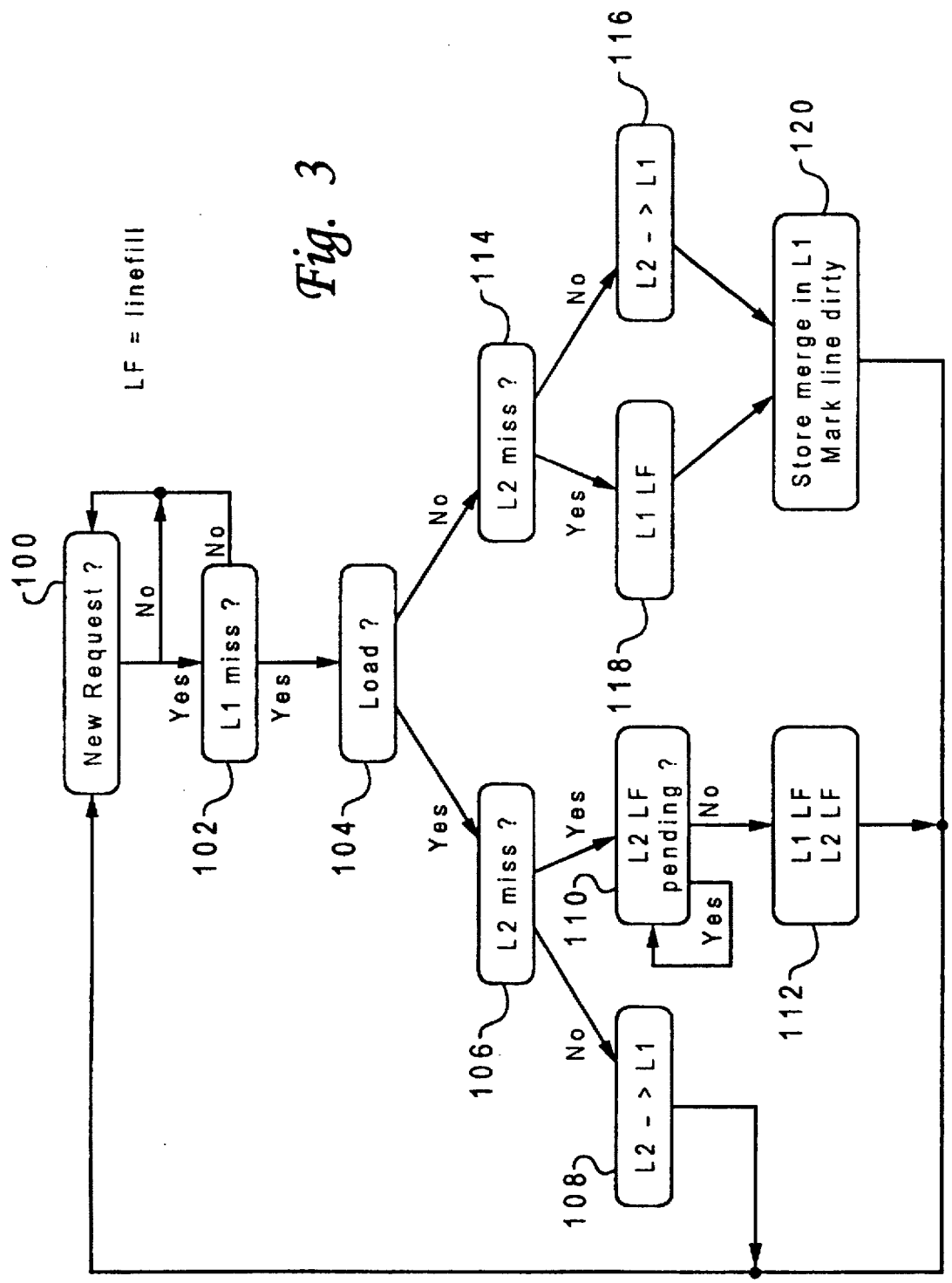
FIG. 3 shows a flow diagram of a method of enhancing memory performance in a data processing system through reduced reloads to a second level cache, in accordance with a preferred embodiment of the illustrative embodiment.

Referring now to FIG. 3, there is shown a flow diagram of a method of enhancing memory performance in a data processing system through reduced reloads to a second level cache, in accordance with a preferred embodiment of the illustrative embodiment. The process is continually held at decision block 100 until a determination is made that a new memory request has been received at the first level cache. Upon receiving a memory request for a cache line, a determination is made if the memory request misses in the L1 cache. If the cache line is contained in the L1 cache, a cache hit occurs on the memory request, causing the cache line to be sent to the processor, and the process of returns to step 100. If the memory request causes a miss in the L1 cache, the process proceeds to step 104, where a determination is made of whether the received memory request is a load request or a store request. If the memory request is determined to be a load, the process proceeds to step 106 where the address of the memory access is passed to the L2 cache. If the memory request produces a cache hit in the L2 cache, the process proceeds to step 108, where the cache line is loaded from the L2 cache into the L1 cache. Thereafter, the process returns to step 100. If the memory access misses in the L2 cache, the process proceeds from decision block 106 to step 110. The process is held at step 110, if the L2 cache has a pending linefill (LF), until the linefill has completed, and then the process proceeds to step 112. At step 112, a linefill of the cache line is performed in both the L1 cache and the L2 cache, and thereafter the process returns to step 100.

If, at step 104, it is determined that the memory request is not a load, and therefore a store, the process proceeds to step 114. The address of the memory access is sent to the L2 cache from the L1 cache, if the hit occurs in the L2 cache, and a linefill of the cache line from the L2 cache to the L1 cache is performed at step 116. If the memory access misses in the L2 cache, the process proceeds from step 114 to step 118, where a linefill of the cache line from main memory is performed in the L1 cache and not the L2 cache, according to the illustrative embodiment. The process proceeds from both steps 116 and 118 to step 120, where the store is merged in the L1 cache by processor 12, and the cache line is marked dirty. Thereafter, the process returns to step 100.

In summary, the data processing system of the illustrative embodiment provides a cache management system that enhances memory performance through reduced reloads to the second level cache. Store-initiated memory requests are serviced by the memory controller by loading the requested cache line only in the first level cache. The resultant reduction in reloads to the second level cache achieved by the illustrative embodiment enhances memory performance by allowing immediate execution of subsequent memory requests to the second level cache because of the elimination of reload queuing for store-initiated requests, and producing a higher hit rate as a result of reduced L2 castouts.

While the illustrative embodiment has been particularly shown and described with reference to a preferred embodiment, it will be understood by those skilled in the art that various changes in form and detail may be made therein without departing from the spirit and scope of the illustrative embodiment.

What is claimed is:

1. A method of enhancing memory performance in a data processing system, comprising:

receiving a memory request for a cache line at a first level cache that results in a miss in both the first level cache and a second level cache;

determining if the received memory request is a load request or a store request;

loading the cache line in the first level cache without the cache line being loaded in the second level cache, in response to a determination that the received memory request is a store request; and loading the cache line in both the first level cache and the second level cache, in response to a determination that the received memory request is a load request.

2. A method of enhancing memory performance in a data processing system according to claim 1, further comprising the step of storing a cache line that was loaded only in the first level cache into the second level cache, in response to a castout of the cache line in the first level cache.

3. A method of enhancing memory performance in a data processing system according to claim 1, wherein the data processing system further includes a processor, and wherein the memory request is received from the processor.

4. A data processing system having enhanced memory performance, comprising:

a processor that issues memory requests;

a multilevel storage system including a first level cache, a second level cache, and a main memory connected to the processor in a memory hierarchy;

a memory controller that retrieves a cache line from main memory when a memory request for the cache line is received from the processor at the first level cache that results in a miss in both the first level cache and the second level cache, wherein the memory controller loads the retrieved cache line in the first level cache without the cache line being loaded into the second level cache if the received memory request is a store request, and the memory controller loads the retrieved cache line in both the first level cache and the second level cache if the received memory request is a load request.

5. A data processing system having enhanced memory performance according to claim 4, further wherein the memory controller stores a cache line that was loaded only in the first level cache into the second level cache, in response to a castout of the cache line in the first level cache.

6. A data processing system having enhanced memory performance, comprising:

circuitry for receiving a memory request for a cache line at the first level cache that results in a miss in both the first level cache and the second level cache;

circuitry for determining if the received memory request is a load request or a store request;

circuitry for loading the cache line in the first level cache without loading the cache line in the second level cache, in response to a determination that the received memory request is a store request; and circuitry for loading the cache line in both the first level cache and the second level cache, in response to a determination that the received memory request is a load request.

7. A data processing system having enhanced memory performance according to claim 6, further comprising circuitry for storing a cache line that was loaded only in the first level cache into the second level cache, in response to a castout of the cache line in the first level cache.

8. A data processing system having enhanced memory performance according to claim 6, wherein the data processing system further comprises a processor, and wherein the memory request is received from the processor.

* * * * *

UNITED STATES PATENT AND TRADEMARK OFFICE
CERTIFICATE OF CORRECTION

PATENT NO. : 5,737,751
DATED : Apr. 7, 1998
INVENTOR(S) : *Patel et al.*

It is certified that error appears in the above-indentified patent and that said Letters Patent is hereby corrected as shown below:

On the cover page of the patent, at [75], please correct the name of the co-assignee from "Intellectual Business Machines Corporation" to: "International Business Machines Corporation."

Signed and Sealed this

Twenty-seventh Day of April, 1999

*Attest:*

Q. TODD DICKINSON

*Attesting Officer*    *Acting Commissioner of Patents and Trademarks*